March 1, 1927.
L. C. MATHEY
FISHING HOOK
Filed Nov. 2, 1926
1,619,147
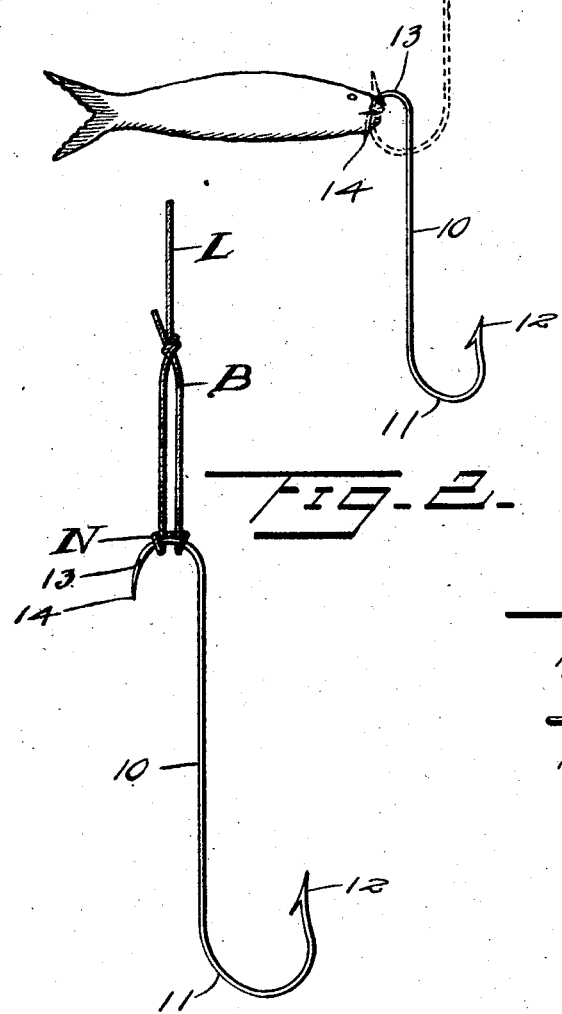

Patented Mar. 1, 1927.

1,619,147

UNITED STATES PATENT OFFICE.

LOUIS C. MATHEY, OF NASHVILLE, TENNESSEE.

FISHING HOOK.

Application filed November 2, 1926. Serial No. 145,821.

This invention relates to fishing hooks and more particularly to a fishing hook which, while capable of use in all forms of bait fishing, is particularly adapted for use in live bait fishing.

An important object of the invention is to provide a hook which may be readily attached to and detached from a line, so that the line may be readily rigged or prepared for storage and a minnow applied thereto may be readily returned to the live bait bucket when the fisherman changes his fishing position.

A further object of the invention is to provide a device whereby a minnow or other live lure may be attached to a hook having a large barb without the formation of an opening in the lure of such size that it will considerably shorten the useful life thereof.

A further object of the invention is to provide a live bait hook construction such that the minnow or other lure employed is prevented from passing from the hook to the line from which the hook is suspended in its struggles to escape from a pursuing fish.

A still further object of the invention is to provide a hook which may be readily withdrawn from the mouth of the fish and without the necessity of tearing the barb from the fish's mouth, thus not only speeding up the operation of unhooking the fish, but likewise leaving the fish in such condition that, it may if desired, be returned to the water without any extensive injury and if it is retained is left in such condition that its vitality is not impaired and it will accordingly remain alive in the live net or upon a stringer for a much greater length of time.

A still further object of the invention is to provide a device of this character so constructed that it is impossible for the fish to completely swallow the hook and the hook is accordingly engaged in the mouth where it may be readily removed.

A still further object of the invention is to produce a hook so constructed that when attached to the line, it has a tendency to tilt or wobble when the fish is struck, so that the barb tends to plant itself firmly in the mouth of the fish.

These and other objects I attain by the construction shown in the accompanying drawings, wherein for the purpose of illustration is shown a preferred embodiment of my invention and wherein:—

Figure 1 is a side elevation showing in solid lines the beginning of an operation of applying a minnow to a hook constructed in accordance with my invention, the completed operation being shown in dotted lines;

Figure 2 is a side elevation of the hook, as applied to the line;

Figure 3 is a plan view thereof.

Referring now more particularly to the drawings, the numeral 10 indicates the shank of a hook 11. The hook 11 may be of any usual or preferred construction and, if desired, the barb 12 thereof may be increased considerably in size, as regards the type of barb usually employed with live bait hooks. The shank 10 at its upper end is arcuately bent to form a hook 13 extending oppositely or at an angle from the shank to the hook 12 and of relatively small size. The bill of this hook comes to a fine needle point 14 and is free from any barbs or roughnesses. A hook of this character is preferably attached to the line L by forming a bight B in this line and then forming a slip noose N upon the end of this bight. It will be obvious that the more severe strain applied to the hook 11, the tighter the line L will grip the hook and the less the tendency of the line to slip from the point 14. When live bait is to be attached to the hook, the hook is removed and then inserted by entering the needle point 14 in the live bait and then passing the hook 13 and shank 10 through the opening, thus formed, until the bait is positioned in the bight of the hook 11 in the usual manner. In Figure 1, I have illustrated the beginning of an operation of applying a minnow to the hook in solid lines, the completed application being indicated by the position of the hook in dotted lines. It will be obvious that by reversing this operation, the minnow or a hooked fish may be very readily removed from the hook. It will also be obvious that the hook 13 will act to prevent the lure from passing up the shank of the hook 10 to the line L which is a common occurrence when minnows are employed, as the result of their struggles in an endeavor to escape an attacking fish. This hook further will act to limit the distance through which the hook 11 and its shank may be taken into the mouth of the fish, thus preventing the hook from being passed to the stomach or gullet of the fish, as often occurs with the ordinary hook in live bait fishing.

Particular attention is directed to the fact that by spacing the connection of the line L with the shank 10 at the opposite side of this shank from the hook 12, the hook is placed at a considerable angle to the line, so that it has a tendency to twist or wobble when it is engaged in the flesh of a fish and the line L is sharply tugged as when "striking." This rocking motion increases the tendency of the barb to enter and likewise increases the angle of the barb to the fish, so that the barb does not have a tendency to tear its way out to allow the fish to escape.

Since the particular construction hereinbefore set forth is capable of a certain range of change and modification without materially departing from the spirit of the invention, I do not limit myself to such specific structure except as hereinafter claimed.

I claim:—

1. A live bait fishing hook the shank of which is provided at its line engaging end with a small open hook facing in the opposite direction from the fish hook and with which the line is adapted to be engaged, said small hook having the bill thereof sharp and free from barbs whereby the line may be slipped therefrom to release the hook.

2. A live bait fishing hook the shank of which is provided at its line engaging end with a small open hook facing in the opposite direction from the fish hook and with which the line is adapted to be engaged, said small hook having the bill thereof sharp and free from barbs whereby the line may be slipped therefrom to release the hook, said small hook and the shank being free from enlargements or obstructions preventing the passage of live bait impaled upon the bill of the small hook thereover to the large hook.

3. A live bait fishing hook the shank of which is provided at its line engaging end with a small open hook facing in the opposite direction from the fish hook and with which the line is adapted to be engaged, said small hook having the bill thereof sharp and free from barbs whereby the line may be slipped therefrom to release the hook, said small hook extending from the shank at the opposite side thereof from the fish hook and lying wholly to one side of the shank.

4. A live bait fishing hook the shank of which is provided at its line engaging end with a small open hook facing in the opposite direction from the fish hook and with which the line is adapted to be engaged, said small hook having the bill thereof sharp and free from barbs whereby the line may be slipped therefrom to release the hook, said small hook and the shank being free from enlargements or obstructions preventing the passage of live bait impaled upon the bill of the small hook thereover to the large hook, said small hook extending from the shank at the opposite side thereof from the fish hook and lying wholly to one side of the shank.

In testimony whereof I affix my signature.

LOUIS C. MATHEY.